United States Patent [19]

Pratt

[11] Patent Number: 4,548,533

[45] Date of Patent: Oct. 22, 1985

[54] WEDGE-TYPE FASTENER

[75] Inventor: John D. Pratt, Rancho Cucamonga, Calif.

[73] Assignee: Monogram Industries, Inc., Providence, R.I.

[21] Appl. No.: 602,356

[22] Filed: Apr. 20, 1984

[51] Int. Cl.$^4$ .............................................. F16B 13/04
[52] U.S. Cl. ...................................... 411/55; 411/45; 411/60; 411/77; 24/607
[58] Field of Search ........................ 411/44, 45, 49, 55, 411/57, 60, 63, 64, 72, 21, 75–80, 347, 354–358; 24/606–608, 453; 279/2 R

[56] References Cited

U.S. PATENT DOCUMENTS 4,192,044  3/1980  Ballerini .............................. 24/607

FOREIGN PATENT DOCUMENTS 596065  4/1960  Canada ................................. 411/21
839089  6/1960  United Kingdom ................... 24/453

Primary Examiner—Gary L. Smith
Assistant Examiner—Neill Wilson
Attorney, Agent, or Firm—Poms, Smith, Lande & Rose

[57] ABSTRACT

A wedge-type fastener which is economical to manufacture and can be installed using known installation tools, such as those used in Europe. The fastener comprises a main body portion having an exterior adapted to be grasped by a tool to hold the same and an insert mounted in its interior keyed to the interior of the main body portion for rotation therewith. A threaded stud having a head keyed to the interior of the insert is also mounted within the body portion having a threaded portion extending out of one end of the body portion. The body portion is closed off at one end by a snap-in cap which also aligns the threaded stud in the body portion and abuts against the insert. The threaded portion of the stud extends through the cap and terminates in a snap-on cap that keeps a threaded nut threaded on the threaded portion of the stud between the first cap and the second cap from running off the stud. The stud, at its other end, includes a pair of wire elements fixedly secured therein. The wire elements extend out of an opening in the insert and out of the main body portion and a spreader, trapped within the body portions, is retained between the wires and held within the body portion. When the body portion is held by a tool and the nut is rotated and abuts against the first cap, the body portion, insert, and spreader do not rotate while the stud extends out of the body portion pulling the wire elements within the body portion with the spacer forcing the elements away from each other to thereby clamp surfaces on the blind or non-accessible side of the aperture in which the fastener is inserted.

10 Claims, 17 Drawing Figures

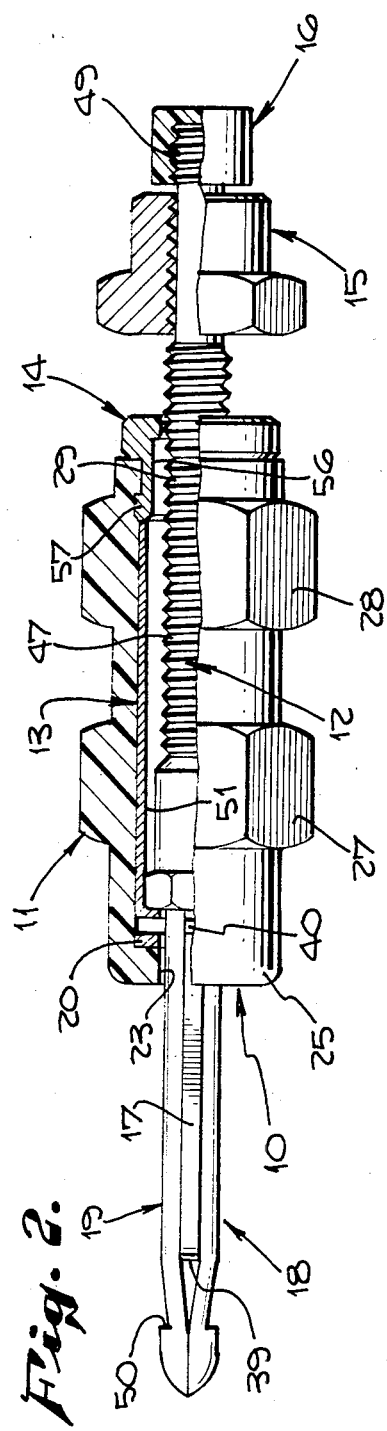
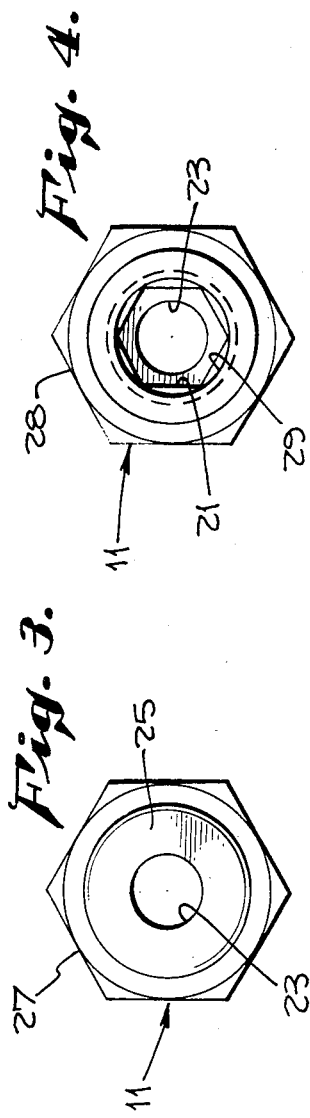
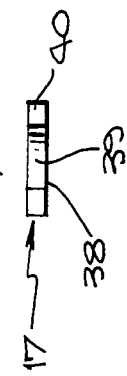
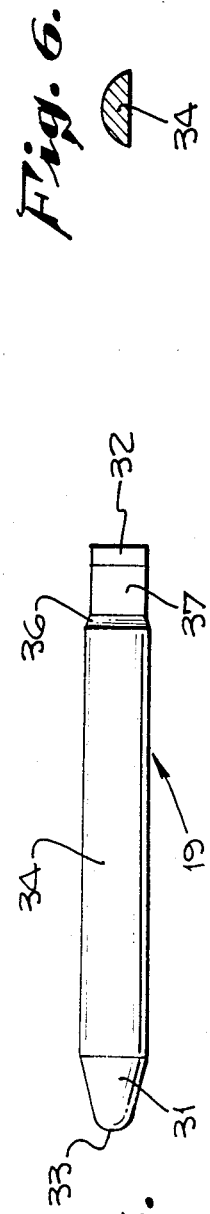

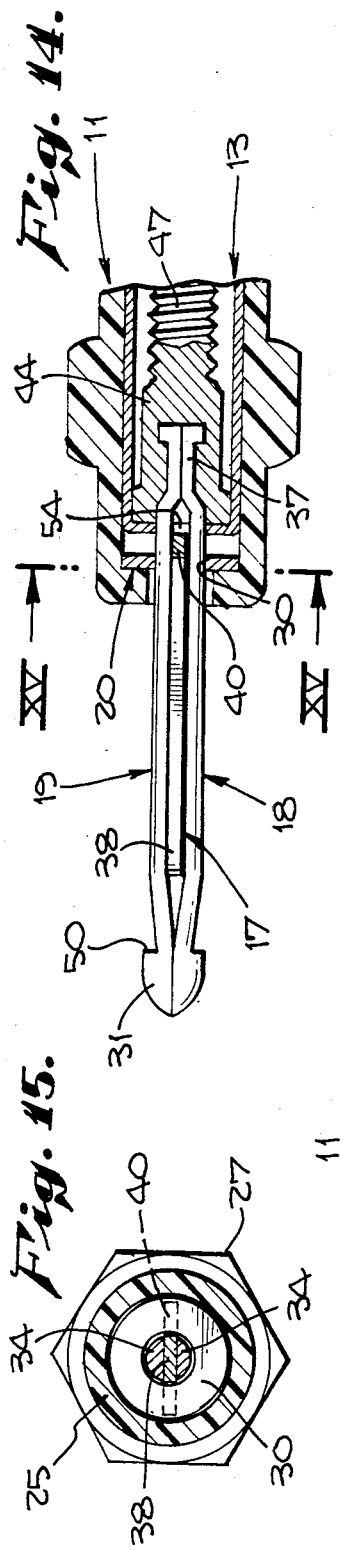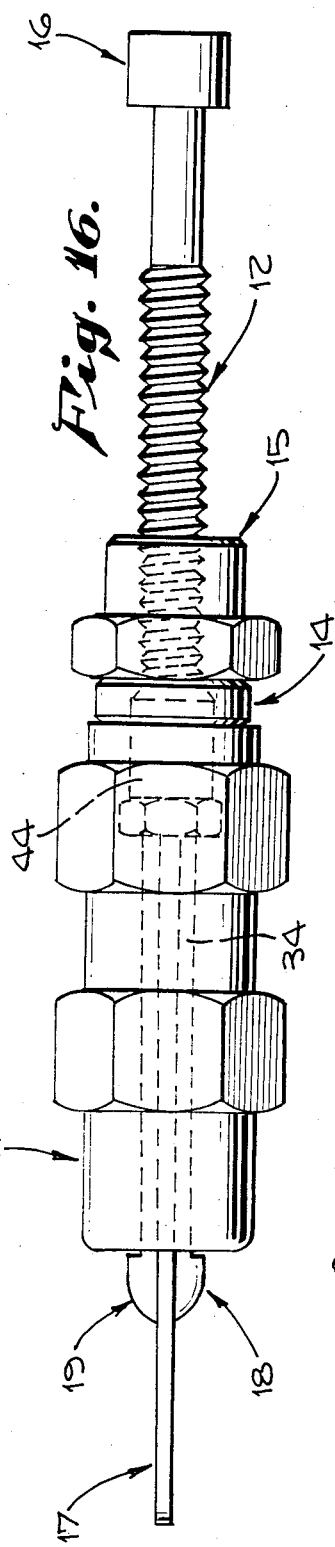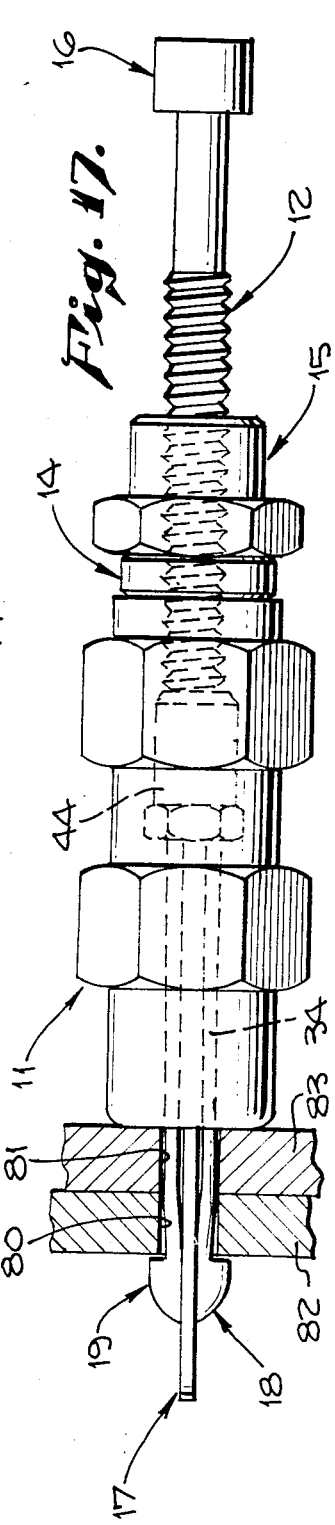

WEDGE-TYPE FASTENER

BACKGROUND OF THE INVENTION

1. Field of the Invention

The invention relates to fasteners, and, more particularly, to an improved wedge-type fastener used to temporarily secure two abutting sheets together permitting permanent fasteners to be installed.

2. Description of the Prior Art

Wedge-type fasteners are known in the art which are used to hold together two abutting surfaces or sheets temporarily while permanent fasteners are installed. Such prior art fasteners generally include a screw having a screw head and a hex body threaded thereon engagable by a tool and a pair of spaced wire elements extending out of the hex body. These elements are insertible into aligned apertures in the sheets or surfaces it is desired to secure together. The hex body is outside of the apertures and the body is held by the tool while a nut or the like on the screw between the screw head and hex body is rotated to move the spaced wire elements connected to the screw thereby spreading the wire elements outwardly as the spreader separates the wire elements and the wires move outwardly against the adjacent aperture surfaces on the nonaccessible or blind side of the sheets. Permanent fasteners may now be installed in any suitable manner and the hex body held and the nut rotated to release the wires and enable removal of the fastener.

These fasteners have particular application in the aircraft art and, in this art, automation in the form of power tools or machines are used to install the permanent fasteners.

Fasteners of this type are used all over the world. However, installation tools used to install such fasteners may differ in various parts of the world. For example, installing tools used in Europe are preset for a particular hex size for use on a particular known type of wedge-type fastener having a plastic body. There is a need for an improved wedge-type fastener that can be installed using installation tools readily available in Europe and other parts of the world. Such a fastener should be less expensive to manufacture than known fasteners presently used in such areas of the world, such as the aforementioned plastic body fasteners, and, of course, should be usable elsewhere as in the United States.

SUMMARY OF THE INVENTION

It is an object of this invention to provide an improved wedge-type fastener which can be manufactured more economically than known prior art fasteners.

It is a further object of this invention to provide a wedge-type fastener which can be installed using European installation tools.

These and other objects are preferably accomplished by providing a fastener having a main body portion having an exterior adapted to be grasped by a tool to hold the same and an insert mounted in its interior keyed to the interior of the main body portion for rotation therewith. A threaded stud having a head keyed to the interior of the insert is also mounted within the body portion having a threaded portion extending out of one end of the body portion. The body portion is closed off at one end by a snap-in cap which also aligns the threaded stud in the body portion and abuts against the insert. The threaded portion of the stud extends through the cap and terminates in a snap-on cap that keeps a threaded nut threaded on the threaded portion of the stud between the first cap and the second cap from running off the stud. The stud, at its other end, includes a pair of wire elements fixedly secured therein. The wire elements extend out of an opening in the insert and out of the main body portion and a spreader, trapped within the body portion, is retained between the wires and held within the body portion. When the body portion is held by a tool and the nut is rotated and abuts against the first cap, the body portion, insert, and spreader do not rotate while the stud extends out of the body portion pulling the wire elements within the body portion with the spacer forcing the elements away from each other to thereby clamp surfaces on the blind or nonaccessible side of the aperture in which the fastener is inserted.

BRIEF DESCRIPTION OF THE DRAWING

FIG. 2 is an assembled view of the fastener of FIG. 1;

FIGS. 3 and 4 are views taken along lines III—III and IV—IV, respectively, of FIG. 1;

FIGS. 5 and 6 are views taken along lines V—V and VI—VI, respectively, of FIG. 1;

FIG. 7 is a view taken along lines VII—VII of FIG. 1;

FIG. 8 is a vertical view of the assembled screw and wire elements alone of the fastener of FIG. 1, partly in cross section;

FIG. 9 is a view taken along IX—IX of FIG. 8;

FIG. 10 is a view taken along lines X—X of FIG. 1;

FIG. 11 is a view taken along lines XI—XI of FIG. 1;

FIG. 12 is a view taken along lines XII—XII of FIG. 1;

FIG. 13 is a view taken along lines XIII—XIII of FIG. 1;

FIG. 14 is a vertical view showing the assembly of the parts of FIGS. 7, 8 and 10, only a portion of screw 12 being shown;

FIG. 15 is a view taken along lines XV—XV of FIG. 14;

FIG. 16 is a view similar to FIG. 1 showing the wire elements retracted into the body of the fastener; and FIG. 17 is a view similar to FIG. 15 showing the fastener inserted into aligned apertures in abutting aircraft panels.

DESCRIPTION OF THE PREFERRED EMBODIMENTS

Figure 1:
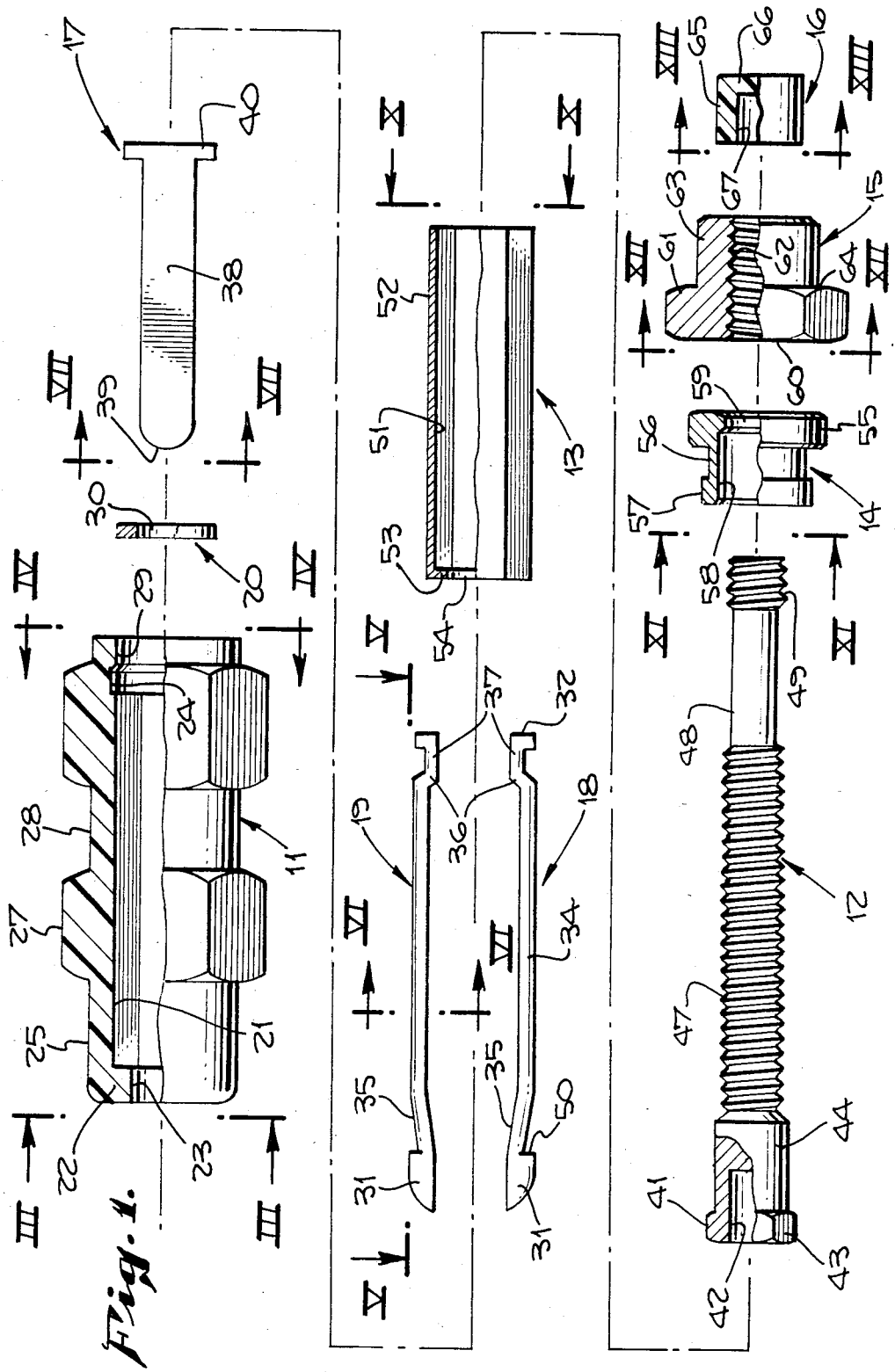
FIG. 1 is an exploded view of a fastener in accordance with the invention.

Referring now to FIG. 1 of the drawing, a wedge-type fastener 10 in accordance with the invention is shown in exploded view. Fastener 10 is compressed of a hexagonally shaped main body portion 11, a screw 12, hex tubing 13, a first end cap 14, a nut 15, a second end cap 16, a spreader 17, a pair of wire elements 18 and 19, and a washer 20. The assembled fastener 10 is shown in FIG. 2.

Body portion 11 (see also FIGS. 3 and 4) includes a hexagonally shaped bore 21 closed off at one end by an end wall 22 having an opening 23 therein. The other end includes an open hexagonally shaped end 29 (see also FIG. 4) having a groove 24 (FIG. 1) adjacent thereto. The outer configuration of main body portion 11 may be generally cylindrical having smooth wall portions 25 and 26 separated by spaced raised hexagonally shaped portions 27, 28 (see also FIGS. 3 and 4, respectively).

Washer 20 (FIG. 1) is a conventional flat washer having an opening 30 there through. Wire elements 18 and 19 are elongated wire elements having an enlarged head 31 at one end and a tail 32 at the other end (element 18 is a mirror image of element 19). As seen in FIG. 6, the main body portion of each element 18, 19 is preferably semi-circular in cross section and, as seen in FIG. 5, head 31 preferably tapers to a rounded point 33 and tail 32 is a reduced square-shaped section. Also, as seen in FIG. 1, the main body portion 34 of each element 18, 19 is generally flat and linear but angling at one end at portion 35 to head 31 forming shoulder 50 and angling at the other end at portion 36 to a flat horizontal portion 37 with tails 32 extending normal thereto. Of course, any suitable wire elements known for use in these type of fasteners may be used. The disclosed elements 18, 19 provide abutment surfaces at portions 35 for the spreader 17 to operate as will be discussed.

The spreader 17 (FIG. 1) is a T-shaped flat member (FIG. 7) having a flat elongated portion 38 rounded off at one end 39 and crossed by a leg 40 extending normal to portion 38.

Stud or screw 12 is shown in vertical view in FIG. 8 with wire elements 18, 19 installed thereon as will be discussed. Screw 12 includes a hexagonally shaped head portion 41 (see also FIG. 9) having an internal cylindrically shaped opening 42 (FIG. 1) prior to assembly of elements 18, 19 therein. Head portion 41 thus has an outer hex portion 43, an integral smooth cylindrical portion 44 (with a shoulder 45 between portion 43 and 44) and a tapered portion 46 extending from portion 44 to a main threaded portion 47. Screw 12 terminates in a threaded portion 49 with a smooth portion 48 between threaded portions 47 and 49.

Tubing 13 is generally hexagonally shaped (see FIG. 10) on both the interior (wall 51 and the exterior wall 52) thereof, open at one end and closed off at the other end by a wall 53 having a round opening 54 therein.

First end cap 14 (see also FIG. 11) includes a smooth walled large diameter portion 55, a smooth walled smaller diameter portion 56 and a smooth walled portion 57 greater in diameter than portion 56 but smaller in diameter than portion 55. Portions 56, 57 form an inner smooth wall 58 while portion 55 includes an inwardly extending inner wall annular portion 59 as shown in FIG. 1.

Nut 15 (see also FIG. 12) includes a main body portion 60 hexagonally shaped on the exterior 61 thereof having an internally threaded bore 62. A smooth walled portion 63, lesser in outer diameter than portion 60, extends therefrom.

Second end cap 16 (see also FIG. 13) is generally cylindrical having a smooth exterior surface 65 closed off at one end by end wall 66 and open at the other forming a cup shaped cavity 67 (FIG. 1).

Referring to FIGS. 1, 2 and 8, the assembly of the fastener 10 will now be described. As seen in FIG. 8, the tails 32 of wire elements 18, 19 are inserted into the opening 42 (FIG. 1) in screw 12 and the cylindrical portion 44 is crimped forcing the interior wall of opening 42 against and around elements 18 and 19, as shown in FIG. 8, thereby trapping the ends of elements 18, 19 therein. As seen in FIG. 8, portions 37 abut against each other and tails 32 are trapped and held internally of screw 12.

The screw 12 is now inserted into the open end of hex tubing 13 (FIG. 1) with heads 31 of elements 18, 19 extending out of opening 54. The spreader 17 is now inserted between elements 18, 19 (FIGS. 14 and 15) and elements 18, 19 are inserted through opening 30 in washer 10 until it abuts against leg 40 of the spreader 17.

The entire subassembly is now inserted into the open end 29 of main body portion 11 until elements 18, 19 extend out of the opening 23. As seen in FIG. 2, the washer 20 is disposed between the leg 40 of spreader 17 and the end wall 22.

First end cap 14 is now inserted into the open end of main body portion 11 with portion 29 entering portion 56 of cap 14 and portion 57 of cap 14 entering groove 24 all as shown in FIG. 2. It can be seen in FIG. 2 that portion 57 abuts against tubing 13 and thus holds end 40 of spacer 17 in fixed position. Threaded portion 47 of course extends out of the opening 59 in cap 14 and nut 15 is now threaded thereon. The second end cap 16 is now forced out threaded end 49 and conforms internally to the threads thereof so that it must be threaded off of end 49 to remove cap 16 (and replace nut 15, if desired). The final assembly is shown in FIG. 2.

The type of nut 15 used in the fastener 10 may vary depending on the installation in which fastener 10 is to be used. Also, the configueration of the main body portion 11 on the exterior thereof may also vary depending on the installation.

Although the body portion 11 may be made of any suitable material, it is preferably made of plastic since such material does not scratch clad aluminum and is compatible with both graphite and titanium. The fastener is installed by insertion of the wire elements 18, 19 into an aperture or aligned apertures in an aircraft skin or the like. A tool, such as a gun, or manually operable tools, is used to hold the hexagonal portion 27, 28 of body portion 11 while simultaneously engaging nut 15. For example, a gun may be used to hold body portion 11 while spinning nut 15. Rotation of nut 15 moves nut 15 until nut 15 abuts against cap 14. Further rotation pulls or retracts wire elements 18, 19 to the right in FIG. 12, with body portion 11, Cap 14, insert 13, spreader 17, washer 20 remaining stationary; and into body portion 11 until shoulders 50 abut against the outer surface of body portion 11 as seen in FIG. 16. Simultaneously, spacer 17, engaged by the inner surfaces of portions 35 of wire elements 18, 19, forces the elements outwardly away from spacer 17. It can be appreciated that the fastener 10 would not reach the FIG. 16 position if it was inserted in an aperture or apertures, such as aligned apertures 80, 81 in abutting aircraft panels 82, 82, respectively, as shown in FIG. 17, but would wedge against these panels 82, 83, as shown, holding the fastener 10 firmly within the apertures in the panels until released.

Of course, the various components may take differing configurations. For example, body portion 11 need not be hex-shaped but any suitable shape engagable by a tool. Portion 26 may be eliminated so that the outer surface of body portion 11 is smooth or cylindrical with a single hex-shaped section of any suitable length. Nut 15 may also be knurled on the outside thereof rather than hex-shaped as shown.

A spring may be provided on the threaded portion of screw 12 between the nut 15 and cap 14, with washers between the spring and caps 14 and 15, respectively, to assist in retraction.

It can be seen that there is disclosed a fastener which costs considerably less to manufacture than known fasteners and can be installed using presently avilable installation tools, such as European-type installing tools.

I claim:

1. A wedge-type fastener comprising:
   a main body portion having an internally smooth walled interior and open at each end thereof;
   a screw member having a screw head at one end and a main threaded portion, said head and said threaded portion being mounted in said body portion wherein said main threaded portion is adapted, in a first position, to be subtantially contained within said main body portion, and, in a second position, have a substantial portion of said main threaded portion extend out of one of the open ends of said body portion;
   a pair of spaced wire elements fixedly mounted at one end in the head of said screw member extending out of the other open end of said main body portion;
   a spacer loosely disposed between said wire members and having one end extending out of said other open end of said main body portion and its other end retained with said body position between said screw head and said other open end of said main body portion;
   an opened ended tubing mounted internally of said main body portion having flange means disposed between said other end of said spacer and said screw head, said screw head being keyed to the inner wall of said tubing for rotation therewith and similarly keyed to the inner wall of said main body portion for rotation therewith;
   an end cap closing off said one end of said main body portion having the main threaded portion of said screw member extending therethrough; and
   a nut threaded on the portion of said main threaded portion extending out of said main body portion.

2. In the fastener of claim 1 wherein said main threaded portion is coupled to a smooth walled screw portion extending out of said main body portion and an end cap is fixedly mounted thereon.

3. In the fastener of claim 1 including a washer mounted within said main body portion between the other end of said spacer and said other open end of said main body portion.

4. In the fastener of claim 1 wherein said main body portion is hexagonally shaped on the exterior thereof.

5. In the fastener of claim 1 wherein said nut is hexagonally shaped on the exterior thereof.

6. In the fastener of claim 1 wherein said first end cap includes an opening through which said main threaded portion extends, said opening being smooth walled with said threaded portion engaging the same and movable therepast, said end cap abutting against said tubing to thereby hold said tubing in fixed position within said body portion.

7. In the fastener of claim 1 wherein the inner wall of both said tubing and said main body portion and the outer exterior of said screw head are hexagonally-shaped.

8. In the fastener of claim 1 wherein said flange means includes an integral wall closing off one end of said tubing having an opening therein through which said wire elements extend.

9. In the fastener of claim 1 wherein said wire elements have portions movable into and out of said main body portion when said nut is threaded on said screw and abuts against said one open end of said main body portion preventing thereby said screw head and said tubing from rotating which moves said screw head laterally in said main body portion, said spacer being forced between said wire elements when said wire elements are so moved to wedge the same outwardly away from said spacer.

10. In the fastener of claim 9 wherein said wire elements have normally abutting abutment surfaces thereon engagable by said spacer forcing said abutment surfaces apart when said elements are so moved.

* * * * *